April 19, 1960   M. G. WOOLFSON ET AL   2,933,687
PULSE STRETCHING CIRCUIT
Filed Dec. 14, 1956
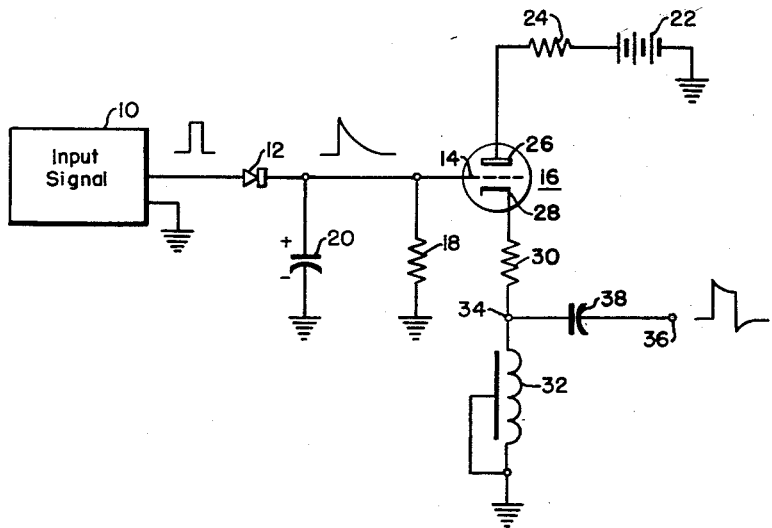
WITNESSES:
Bernard R. Gieguez
Leon J. Faya
INVENTORS
Paul E. Seeley, Martin G. Woolfson,
and Ralph E. Horman.
BY
T. N. Murray
ATTORNEY

2,933,687
PULSE STRETCHING CIRCUIT

Martin G. Woolfson, Baltimore, and Ralph E. Horman, Sykesville, Md., and Paul E. Seeley, Newton, Mass., assignors to Westinghouse Electric Corporation, East Pittsburgh, Pa., a corporation of Pennsylvania Application December 14, 1956, Serial No. 628,424

4 Claims. (Cl. 328—58)

This invention relates to circuit means for lengthening the pulse width of input voltage pulses applied thereto.

It is an object of this invention to provide a circuit which is capable of stretching narrow pulses into longer pulses of a predetermined width. In most prior art pulse stretching circuits of the general type shown in the patent to Hall, No. 2,472,209, a capacitor is charged by an input pulse which initiates an output pulse appearing across the capacitor. The input pulse is also applied through a delay line to the grid of an electron valve connected in parallel with the capacitor. When the input pulse has proceeded through the delay network to the grid of the electron valve, the valve is rendered conductive to thereby short-circuit the capacitor and terminate the output pulse appearing across the capacitor.

In the present invention, an electron valve is provided having a short-circuited delay line connected in its cathode circuit. A parallel resistor and capacitor network is connected in the grid circuit of the electron valve, and input pulses are applied to the circuit through a diode. When an input pulse is applied to the capacitor-resistor network, the capacitor is charged to cause the electron valve to conduct. After a predetermined time determined by the electrical length of the delay line, a pulse of opposite polarity is reflected from the delay line back to the cathode of the electron valve to apply a sharp negative potential thereto. The output of the circuit is taken across the delay line, the negative pulse reflected from its short-circuited end driving the cathode negative and terminating the output pulse.

The above and other objects and features of the invention will become apparent from the following detailed description taken in connection with the accompanying single figure drawing which illustrates the invention in schematic circuit form.

Referring now to the drawing, a source of narrow input voltage pulses 10 is shown having one of its output terminals grounded. The other output terminal is connected through a diode rectifier 12 to the grid 14 of a triode vacuum tube 16. The grid 14 is connected to ground through the parallel combination of resistor 18 and capacitor 20. A source of driving potential, such as battery 22, is provided for triode 16 and has its positive terminal connected through limiting resistor 24 to the anode 26 of the triode. Cathode 28 of triode 16 is connected to ground through resistor 30 and a short-circuited delay line network 32. A short-circuited delay line of this type reflects back to its input terminal 34 a wave equal in width to the input wave, but of opposite polarity and delayed by twice the delay of the delay line. Output pulses from the circuit are taken between ground and output terminal 36 which is connected to point 34 through condenser 38. The condenser 38 is used in an obvious manner to prevent direct current components from appearing in the output signal.

In operation, when a narrow positive voltage pulse is fed through diode 12 to grid 14, capacitor 20 will be charged with the polarity shown in the drawing. After capacitor 20 has been charged and the positive pulse from source 10 disappears, the capacitor must discharge through resistor 18 since diode 12 prevents it from discharging into the input circuit. The discharge time constant of resistor 18 and capacitor 20 is long compared to the width of pulses from source 10 so that an exponentially decaying wave form of relatively long period is seen at grid 14. The delay line 32 in the cathode circuit of triode 16 is designed so that its time delay is one-half that of the desired output pulse width. The value of resistor 30 is chosen so that the output impedance of the cathode follower 16 plus the value of resistor 30 is equal to the characteristic impedance of delay line 32. In this manner resistor 30 prevents unwanted reflections produced by the delay line.

At the instant that a positive voltage pulse appears at grid 14, cathode 28 begins to rise in voltage, following the voltage on the grid. Due to the fast response time of the cathode follower, the output voltage is a relatively good reproduction of the grid voltage. As shown, the top of the output pulse will deviate from a true flat top by a small amount since the voltage on grid 14 will decay in accordance with the exponential decay time of resistor 18 and capacitor 20. Since delay line 32 is terminated in a short circuit, a pulse traveling down the delay line will come back to terminal 34 equal in amplitude to the ingoing pulse, but delayed in time by twice the delay time of the line and of opposite polarity. Therefore, after a time equal to twice the delay time of line 32, the leading edge of the input pulse is reflected back in the cathode circuit with a negative polarity. The reflected voltage, when added to the positive voltage at the cathode 28, will produce zero amplitude.

It might appear that since the cathode 28 goes negative due to the reflected pulse from line 32, the positive voltage on grid 14 will cause triode 16 to conduct more heavily. Actually, however, the first edge of the reflected pulse from the delay line 32 causes the cathode potential to become less negative than the grid potential. This is due to the fact that the small direct current from battery 22 causes a quiescent voltage drop across the delay line 32 and resistor 30 so that cathode 28 is at a potential of a few millivolts above ground. Consequently, since grid 14 is now slightly negative with respect to cathode 28, grid current will flow from grid 14 to cathode 28 to rapidly discharge capacitor 20. Thus, the stored charge on capacitor 20 is disposed of and the cathode and grid potentials are brought sharply down to zero potential in preparation for the next successive input pulse from source 10.

Although the invention has been described in connection with a certain specific embodiment, it should be readily apparent to those skilled in the art that various changes in form and arrangement of parts may be made to suit requirements without departing from the spirit and scope of the invention. In this respect, it will be apparent that triode 16 could be readily replaced by a transistor device in which the emitter, base and collector correspond to the cathode, grid, and anode of the triode, respectively.

We claim as our invention:

1. A pulse duration stretching circuit comprising, in combination, an output terminal, a source of driving potential, electron valve means controlling conduction between said source and said output terminal, a pair of terminals for receiving an input voltage pulse to render said electron valve means effective to initiate an output voltage pulse in said output terminal, storage means charged via said pair of terminals during a voltage pulse to maintain said electron valve means conductive for a duration longer than that of said input voltage pulse, and delay line means through which said output voltage travels, is reflected, and returns to cancel the initially applied voltage and thereby terminate said output voltage pulse.

2. A pulse duration stretching circuit comprising, in combination, an output terminal, a source of driving potential, electron valve means controlling conduction between said source and said output terminal, a pair of terminals for receiving an input voltage pulse to render said electron valve means effective to initiate an output voltage pulse in said output terminal, storage means charged via said pair of terminals during a voltage pulse to maintain said electron valve means conductive for a duration longer than that of said input voltage pulse, and delay line means through which said output voltage travels, is reflected, and returns to cancel the initially applied voltage and thereby terminate said output voltage pulse and through which a small direct current from said source flows to cause said electron valve means to discharge said storage means and thereby prepare said valve means for response to a subsequent input pulse.

3. A pulse duration stretching circuit comprising, in combination, pulse output means, an electron valve having a control electrode, a source of driving potential, pulse input means for applying an input voltage pulse to said control electrode to establish connection of said driving potential to said pulse output means for initiation of an output voltage pulse therein, voltage storage means charged from said input means to maintain application of an effective voltage to said control electrode for a duration exceeding that of the stretched pulse desired in said pulse output means, and reflective delay line means connected to said pulse output means for delay and reversal in polarity of the initially applied voltage to terminate the output voltage pulse by cancellation following termination of the voltage pulse from the pulse input means.

4. A pulse duration stretching circuit comprising, in combination, pulse output means, an electron valve having a control electrode, a source of driving potential, pulse input means for applying an input voltage pulse to said control electrode to establish connection of said driving potential to said pulse output means for initiation of an output voltage pulse therein, voltage storage means charged from said input means to maintain application of an effective voltage to said control electrode for a duration exceeding that of the stretched pulse desired in said pulse output means, and reflective delay line means connected to said pulse output means for delay and reversal in polarity of the initially applied voltage to terminate the output voltage pulse by cancellation following termination of the voltage pulse from the pulse input means and for rendering said electron valve means effective to discharge said voltage storage means and cancel the voltage applied to said control electrode in preparation for response to a subsequent pulse from said pulse input means.

References Cited in the file of this patent

UNITED STATES PATENTS

| | | |
|---|---|---|
| 2,255,839 | Wilson | Sept. 16, 1941 |
| 2,472,209 | Hall | June 7, 1949 |
| 2,579,473 | Chatterjea | Dec. 25, 1951 |
| 2,579,497 | Isbister | Dec. 25, 1951 |
| 2,707,751 | Hance | May 3, 1955 |